United States Patent [19]

Verbaarschot et al.

[11] Patent Number: 5,185,606
[45] Date of Patent: Feb. 9, 1993

[54] PRIMARY FLIGHT DISPLAY PRESENTING RESOLUTION ADVISORY INFORMATION PROVIDED BY A TRAFFIC ALERT AND COLLISION AVOIDANCE SYSTEM

[75] Inventors: Petrus A. A. Verbaarschot, Alphen A/D Rijn; Michel M. C. Schless, Amsterdam; Wim J. Hultzer, Noordwijkerhout, all of Netherlands

[73] Assignee: Fokker Aircraft B.V., Schiphol-Oost, Netherlands

[21] Appl. No.: 520,507

[22] Filed: May 8, 1990

[51] Int. Cl.$^5$ .............................................. G08G 5/04
[52] U.S. Cl. .................................. 340/961; 340/975; 364/461
[58] Field of Search ............... 340/961, 967, 968, 974, 340/975; 364/461; 342/29, 455

[56] References Cited

U.S. PATENT DOCUMENTS

| 3,621,210 | 11/1971 | Canning et al. | 340/961 |
| 4,786,905 | 11/1988 | Muller | 340/967 |
| 4,910,513 | 3/1990 | Kelly et al. | 340/974 |
| 4,914,733 | 4/1990 | Gralnick | 340/961 |

OTHER PUBLICATIONS

"Coping with Wind Shear", Flight International, Sep. 22, 1979, pp. 983-986.
"Customer Input Aids Development of Advanced Fokker 100 Cockpit", Aviation Week and Space Technology, Feb. 23, 1987, pp. 43, 44, 46.
AIAA Atmospheric Flight Mechanics Conference of Aug. 14-16, 1989, paper 89-3361.
"737-300 Electronic Flight Instrument System", Airliner, Apr./Jun. 1987, pp. 8-12.
"Traffic Alert and Collision Avoidance System", Aircraft Engineering 1-88, pp. 27-29.
FAA Advisory Circular AC 20-131, Mar. 10, 1988.
"ATA Standard for TCAS II, Displays, Symbology and Controls", ATA-STD-TCAS II/1A, Jun. 15, 1989, Air Transport Association of America.
"Minimum Operational Performance Standards for Traffic Alert and TCAS", RTCA/DO-185, Sep. 23, 1983.

Primary Examiner—Jin F. Ng
Assistant Examiner—Brent A. Swarthout
Attorney, Agent, or Firm—Handal & Morofsky

[57] ABSTRACT

A display for presenting symbolically to an aircraft flight crew the resolution advisory information developed by a Traffic Collision Avoidance System (TCAS) computer aboard an aircraft. The flight display shows a a line symbol representing the artificial horizon, a pitch scale extending perpendicular to said line symbol and indicating pitch angles with reference to said line symbol, and an aircraft reference symbol indicating by its position along said pitch scale the momentaneous aircraft pitch attitude. Furthermore a pitch cue symbol is displayed consisting of a first line segment extending parallel to the artificial horizon and across said pitch scale, said first line segment indicating a limit pitch value processed from the TCAS vertical speed limit ouput, and an area indicator extending below or above said line segment indicating a range of pitch values bounded by said limit pitch value, which range of pitch values has to be avoided by the aircraft flight crew.

7 Claims, 8 Drawing Sheets

PRIMARY FLIGHT DISPLAY PRESENTING RESOLUTION ADVISORY INFORMATION PROVIDED BY A TRAFFIC ALERT AND COLLISION AVOIDANCE SYSTEM

TECHNICAL FIELD

The present invention relates to electronic flight deck displays and particularly to the Primary Flight Display (PFD) of the Electronic Flight Instrument System (EFIS). More specifically the invention relates to a Primary Flight Display designed for presenting symbolically to an aircraft flight crew the resolution advisory information developed by a Traffic Collision Avoidance System (TCAS) computer aboard an aircraft.

BACKGROUND OF THE INVENTION

With the rapid growth of peacetime aviation, especially in the jet transport category, the risk of mid-air collisions and near misses has increased over the years. Although there have been improvements in control techniques and technology, all too frequently human error and lapses in control efficiency increase the probability of misses and collisions.

From 1955 the development of airborne collision avoidance systems has been the subject of studies and research. In 1987 the United States, through the Federal Aviation Administration (FAA), decided to introduce such a system on a large scale and the carriage of Traffic Alert & Collision Avoidance System (TCAS II) equipment will become mandatory at the first of Jan. 1991 for 20% of all aircraft operating in the U.S. airspace and capable of carrying 30 passengers or more, at the first of Jan. 1993 for 50%, Jan. 1, 1994 for 100%, including Part 121 air carriers.

TCAS II is a system that provides collision avoidance advisories, only in the vertical plane, by means of vertical speed commands. General developments in TCAS are given for example by Aircraft Engineering of Jan. 1988, pages 27-29. Guidelines for the implementation of TCAS II in aircraft are presented in "Airworthiness and operational approval of Traffic Alert and Collision Avoidance Systems (TCAS II) and mode S transponders", Advisory Circular AC 20-131, Mar. 10, 1988, of the FAA. Further information can be found in "ATA Standard for TCAS II, displays, symbology and controls", ATA-STD-TCAS II/1A of Jun. 15, 1989 as well as in another document, "Minimum Operational Performance Standards for Traffic Alert and Collision Avoidance System", RTCA/DO-185.

The hardware required to implement TCAS equipment on board of an aircraft consists in a practical embodiment of a mode-S transponder, a TCAS computer, related antennes, a control panel and display devices. More specifically the equipment may comprise two display devices: a Traffic Display to alert the crew to the presence of another aircraft in the neighborhood and a Resolution Advisory Display that advises the crew of the rate of altitude change necessary to avoid a collision.

The TCAS equipment transmits interrogation signals to transponder equipped aircraft within its immediate vicinity and receives reply signals from said aircraft. By measuring the time intervals between the interrogation and the reply the TCAS computer can determine the relative range, bearing and altitude. With this information the TCAS Computer can determine a potential threat and will, if necessary, generate advisories.

Three threat levels are distinguished by TCAS. The lowest level is that of the other proximity aircraft (PA), which simply tells the flight crew that another aircraft is in the neighborhood. This advisory is displayed on the Traffic Display (TD) which is embodied as a plan position indicator (PPI).

When an other aircraft is close but not yet a hazard the second level, a traffic advisory (TA), is generated. On the Traffic Display (TD) the shape and color of the symbol representing that other aircraft will change and the audio advisory "TRAFFIC" is heard.

The third level, a resolution advisory (RA), indicates a potential collision course. Once more the shape and color of the symbol representing the intruder will change on the Traffic Display (TD). Simultaneously, on the Resolution Advisory Display (RA) the flight crew gets instructions on how to resolve the conflict. For TCAS II these instructions consist of vertical speed command only. When the RA appears a voice is heard indicating the type of RA.

It is well known, for instance from the above mentioned publications, to combine the Resolution Advisory Display with the Instantaneous Vertical Speed Indicator (IVSI) which provides data about the vertical speed of the aircraft. Such an instrument can be embodied as a conventional round dial instantaneous vertical speed indicator. Flight International of Sep. 22, 1979, pages 984 to 985, gives illustrations of such an instrument. The VSI-needle shows the rate of climb or descent of the aircraft by the position of a pointer on a circular scale. TCAS resolution advisories pointing out that the aircraft has to descend or climb at a limited rate, are displayed on the IVSI by illuminating with a red arc along the perimeter the vertical speeds that must be avoided in order to maintain safe vertical separation, in combination with a green "fly to" symbol. The pilot has to maneuver the aircraft promptly to achieve a vertical speed just out of the illuminated red arc, following the green "fly to" arc, or to maintain a vertical speed out of the illuminated red arc area, if currently not in it.

An example of a round dial display is described in the international patent application WO 89/04003 of Allied-Signal Inc., titled "Traffic Advisory Vertical Speed and Radar Display". In fact this publication describes a combination of a Traffic Display (TD) with an Instantaneous Vertical Speed Indicator (IVSI). Whenever the TCAS computer determines that a particular aircraft constitutes a collision threat the computer issues a resolution advisory which is, as indicated above, displayed on the one hand by identifying the threatening aircraft with a characterizing symbol on the PPI section of the display and on the other hand by presenting either an arrow symbol directed up or down depending on wether the resolution advisory is CLIMB or DESCEND or an arrow symbol in combination with a DON'T symbol indicating a DON'T CLIMB or a DON'T DESCEND advisory.

Instead of a separate Instantaneous Vertical Speed Indicator the vertical speed can be displayed on the Primary Flight Display (PFD) format, which is always situated on the pilot's front panel. PFD's are described for example by the publications Boeing Airliner Apr.-/Jun. 1987, pages 8 to 12, Aviation Week & Space Technology, Feb. 23, 1987, pages 43 to 46 and Paper 89-3361 of the AIAA Atmospheric Flight Mechanics Conference of Aug. 14-16, 1989 in Boston. A PFD indicates with analog strips, digital references and symbols at least the heading of the aircraft, the airspeed, the attitude, the altitude and the vertical speed. A vertically oriented scale or tape at the right hand of the display field, having graduations representing speed values and a movable pointer, is used to indicate the speed. In the case of Resolution Advisories a red zone shall be shown on the vertical speed scale for the forbidden vertical speeds. Thereby a green "fly to" region shall be attached to the red zone for corrective RA's.

A practical embodiment of such a primary flight display providing a variety of different data to the crew is described in the European patent application EP-A-0 324 195. This display comprises a central attitude director field for displaying a line symbol representing the artificial horizon, a pitch scale extending perpendicular to said line symbol and indicating pitch angles with reference to said line symbol, and an aircraft symbol indicating by its position along said pitch scale the momentaneous aircraft pitch attitude.

There is more information that can be provided by the PFD to the flight crew. The U.S. Pat. No. 4,910,513 of The Boeing Company relates to a PFD which visualizes next to the pitch attitude of the aircraft, the margin between the current angle of attack and the angle of attack at which onset of stall warning occurs. In other words, to escape from a critical windshear situation which is always performed by a pitch-up maneuver, the PFD is providing the pilot a visual feedback for a safe pitch-up maneuver.

An object of the invention is now to provide an improved display of the type mentioned above.

SUMMARY OF THE INVENTION

The embodiments of the present invention pertain to Primary Flight Displays (PFD) at which Resolution Advisories (RA) for TCAS II are announciated at the Vertical Speed Indicator (VSI). The RA consists for example of a double red line symbol on the vertical speed tape, indicating the vertical speed range which has to be avoided. Moreover, in case of a corrective RA, a similar green symbol is added in order to provide for a "fly to" indication. These symbology approximates the recommended RA indications as specified in above mentioned recommendations for dial-type IV-SI's. However, flight simulator tests which were carried out to evaluate proposed TCAS II symbology for RA's on PFD showed that pilots fly on pitch attitude primary and use the VSI for secondary information. Therefore a pilot's first reaction for an evasive maneuver in the vertical plane will be related to pitch attitude changes rather than VS indications.

In agreement with the invention a pitch cue on the PFD was developed which would unmistakably inform the pilot about the evasive action that has to be taken immediately in the case of a corrective RA, or the action that has to be prevented in the case of a preventive RA. The "get out the red" pitch cue (nose up or nose down) should allow easy pilot accustomization using standard pilot techniques without the need of pilots being subjected to elaborate training schedules.

The pitch cue symbol displayed on the primary flight display in agreement with the invention consists of a first line segment extending parallel to the artificial horizon and across said pitch scale, said first line segment indicating a limit pitch value processed from the TCAS vertical speed limit output, and an area indicator extending below or above said line segment and indicating a range of pitch values bounded by said limit pitch value, which range of pitch values has to be avoided by the aircraft flight crew.

Preferably the area indicator consists of two auxilliary line segments extending from the opposite ends of said first line segment perpendicular thereto in the direction of the pitch values to be avoided such that a U-shaped symbol is obtained which is displayed across the pitch ladder. The first line segment forming the horizontal leg of the U-shaped symbol which remains parallel to the aircraft reference symbol on the PFD, indicates the pitch attitude required to get out the red vertical speed zone. The red pitch zone, defined by the area indicator, consists in the preferred embodiment of said two auxilliary line segments.

To provide an unmistakable advise for immediate corrective action by the pilot in case of a corrective Resolution Advisory, an arrow-shaped symbol, indicating the direction of the required pitch change, is added to the U-shaped pitch symbol. The arrow disappears as soon as the desired pitch attitude has been attained.

In the case of a so-called "maintain" advisory, consisting of a combination of a DON'T CLIMB and a DON'T DESCENT command, preferably a bias is included to ensure a separation between the two U-shaped symbols and between the two red bands on the Vertical Speed Indicator.

BRIEF DESCRIPTION OF THE DRAWINGS

FIG. 1 is illustrative of a prior art display which can be presented for instance on the screen of a cathode ray tube or a liquid crystal device. The display field shows at the left of the center display area an air speed scale 12, at the right of the center display area an altitude scale 14 and further right a vertical speed scale 16. In the central display area an aircraft reference symbol is displayed comprising the boresight box 18 representing the airplane longitudinal axis at the center of the box and on either side thereof the conventional stationary aircraft symbols 20 and 22. An artificial horizon is provided by line 24 between an upper pitch scale area and a lower pitch scale area. Both pitch scale areas are in the prior art embodiments differently colored.

Figure 1:
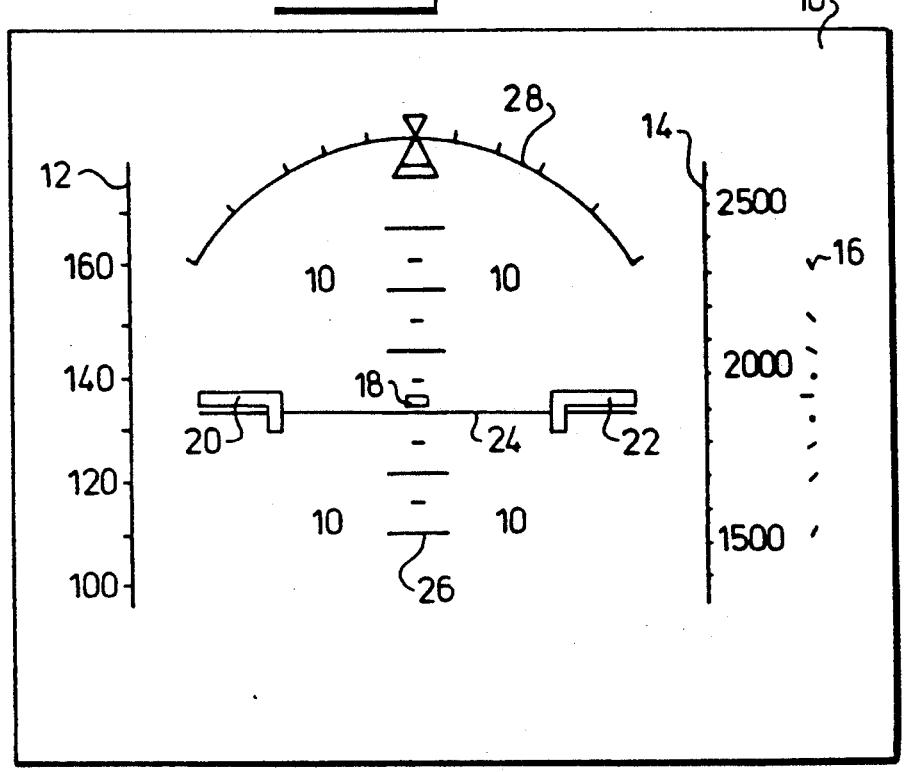
FIG. 1 is illustrative of a front view of a prior art integrated PFD. At the right hand of the field the vertical speed is displayed. On the vertical center line of the attitude director field an incremental pitch scale line is projected defining the orientation of the aircraft in degrees of upward or downward pitch attitude.

The actual pitch scale is represented by the ladder 26. At the upper boundary of the central display area a roll scale 28 is displayed. The overall presentation illustrated in FIG. 1 is considered as known to the expert in this field and does not need any detailed explanation.

In the following figures some of the reference numbers pointing to elements described above are omitted to avoid an accumulation of reference numbers in one figure.

Figure 2A:
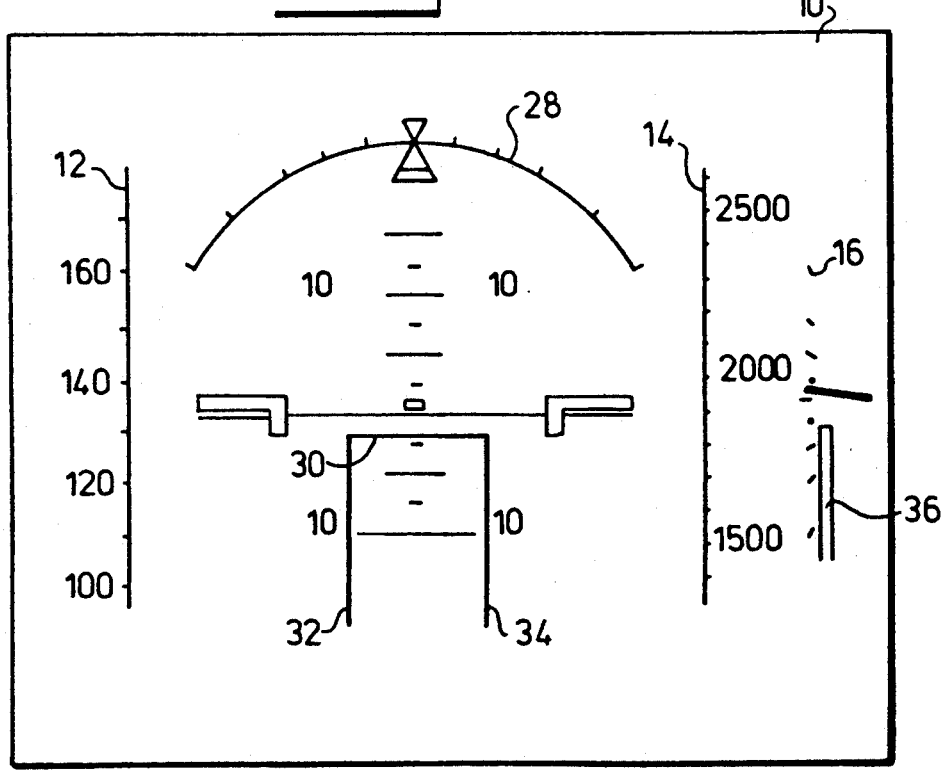
FIGS. 2a, 2b and 2c represent exemplary embodiments of the display of the resolution advisory presentation in situations in which the crew in fact only has to maintain the present attitude.

FIG. 2A illustrates the presentation of a pitch cue symbol indicating a DON'T DESCENT advisory. The symbol comprises a horizontal line segment 30 parallel to the horizontal axis of the aircraft reference symbol and two vertical auxiliary line segments 32 and 34, which are positioned such that together the line segments 30, 32 and 34 define a U-shaped symbol. The values of the pitch scale surrounded by the U-shaped resolution advisory symbol are in the "red area" which should be avoided by the aircraft. Simultaneous with the presentation of the U-shaped resolution advisory symbol a vertical speed area indicator 36 is displayed along the vertical speed scale 16 indicating a range of vertical speed values which should be avoided. This indicator may consist of two adjacent vertical line segments connected at the end by a short horizontal connecting line. Instead thereof also a massive thick line or bar of corresponding length may be displayed. Preferably both the U-shaped symbol 30, 32, 34 and the indicator 36 are displayed in a contrasting color, for instance a red color, indicating symbolically the "red area" which is momentaneously not advisable.

In the situation represented by the display illustrated in FIG. 2A it is sufficient for the crew to maintain the present attitude and therefor no specific action is required.

Figure 2B:
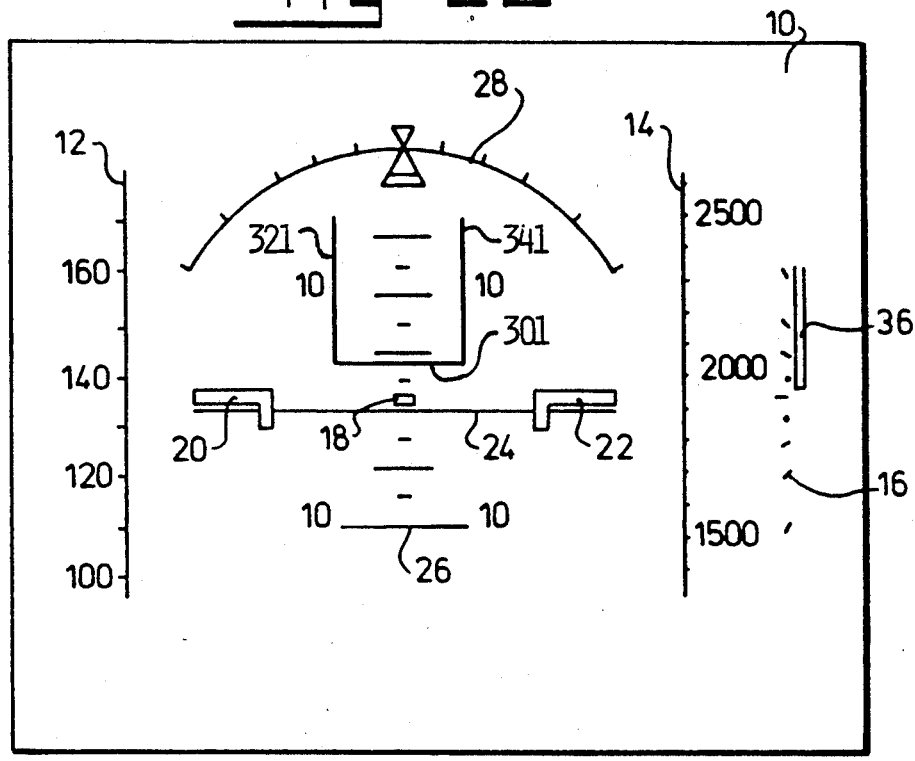

It will be clear that a similar presentation can be used to display a DON'T CLIMB advisory. FIG. 2B illustrates such a DON'T CLIMB advisory. In this case the U-shaped symbol 301, 321, 341 covers a range of positive pitch values along the pitch scale. Simultaneously the red bar indicator 501 is displayed along the vertical speed scale 16 indicating the red zone of vertical speed values. Also in this situation it is sufficient for the crew to maintain the present attitude. No specific action is required.

In a situation with more traffic it is not inconceivable that there are other aircraft both above and below the own aircraft. In such a case the resolution advisory may be displayed in the form of two combined U-shaped symbols as is illustrated in FIG. 2C.

Figure 2C:
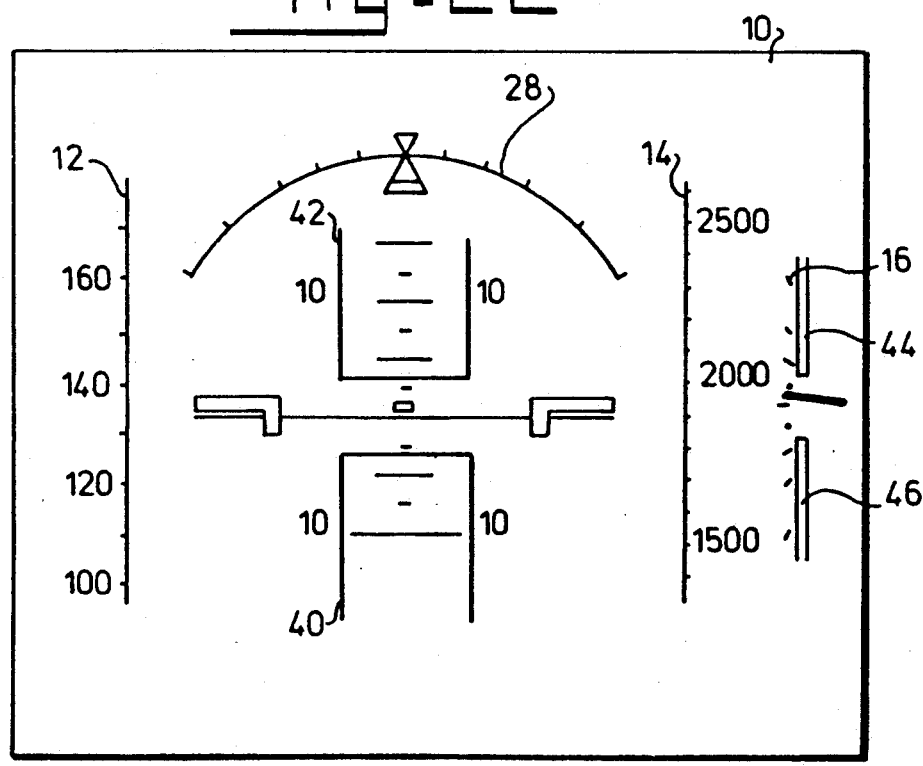

In FIG. 2C two U-shaped symbols are shown indicated as a whole by 40 and 42 respectively. Both U-shaped resolution advisory symbols together define two pitch value ranges which should be avoided momentaneously by the crew of the aircraft. In other words, both U-shaped advisory symbols define in between them a small area of "green" values, which values are allowed. Simultaneously two red bar indicators 44 and 46 are displayed along the vertical speed scale 16 indicating the forbidden vertical speed values. As appears from FIG. 2C the momentaneous pitch value and the momentaneous vertical speed of the aircraft are both the "green" zone so the crew in this situation does not have to take any specific action but just has to maintain the course and attitude of the aircraft as it is.

Preferably a predetermined bias distance is maintained on the screen between the horizontal line segments of both symbols 40 and 42 assuring that the "green" zone inbetween is clearly visable to the crew.

In a situation in which the aircraft crew has to take some action to avoid a possible threat an arrow shaped symbol is added to the U shaped symbol, whereby the arrow points in the direction of the "green" zone. Examples thereof are illustrated in FIGS. 3A and 3B.

Figure 3A:
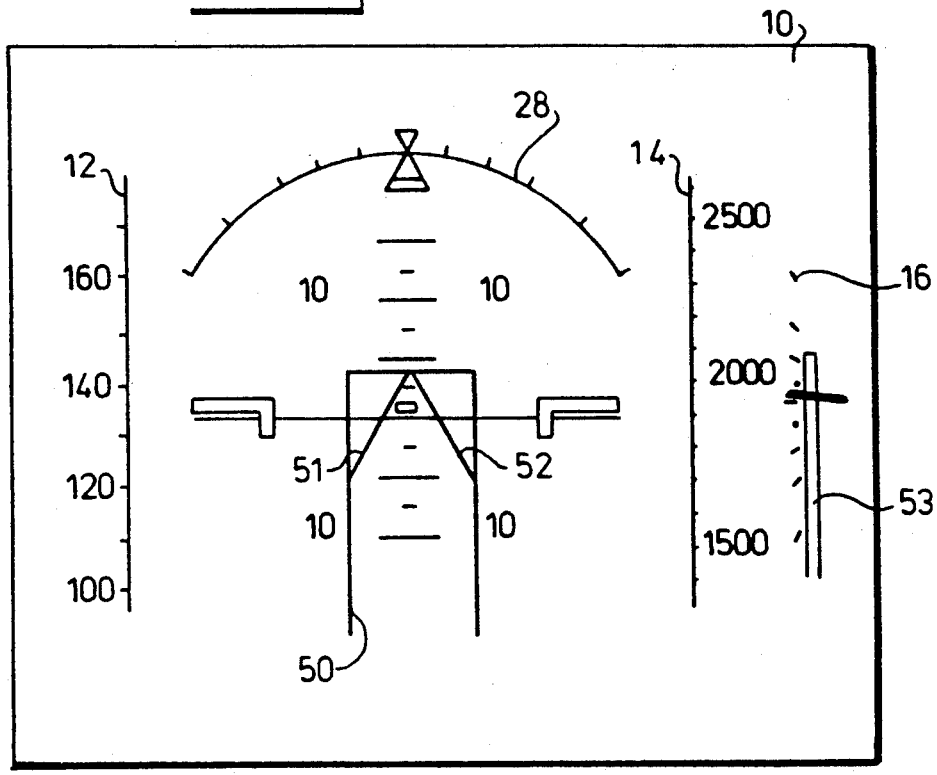
FIGS. 3A and 3B represent exemplary embodiments of the display of the resolution advisory presentation in situations in which the crew has to take action to avoid a dangerous situation.

FIG. 3A shows a display for the situation in which the TCAS computer has issued corrective resolution advisory CLIMB.

As is shown in FIG. 3A two sloped lines 51 and 52, together forming an arrow-shaped symbol are added to the U-shaped symbol which as a whole is indicated by the reference number 50. The combined resolution advisory symbol 50, 51, 52 indicates to the crew in the situation illustrated in this figure that the crew has to change the pitch angle. Simultaneously the red bar 53 is displayed alongside the vertical speed scale 16 indicating that the crew has to increase the vertical speed to get out of the red zone. Together the combined resolution advisory symbols 50-53 indicate clearly to the crew that they have to undertake some action to increase both the pitch angle and the vertical speed. In other words the aircraft has to climb.

Figure 3B:
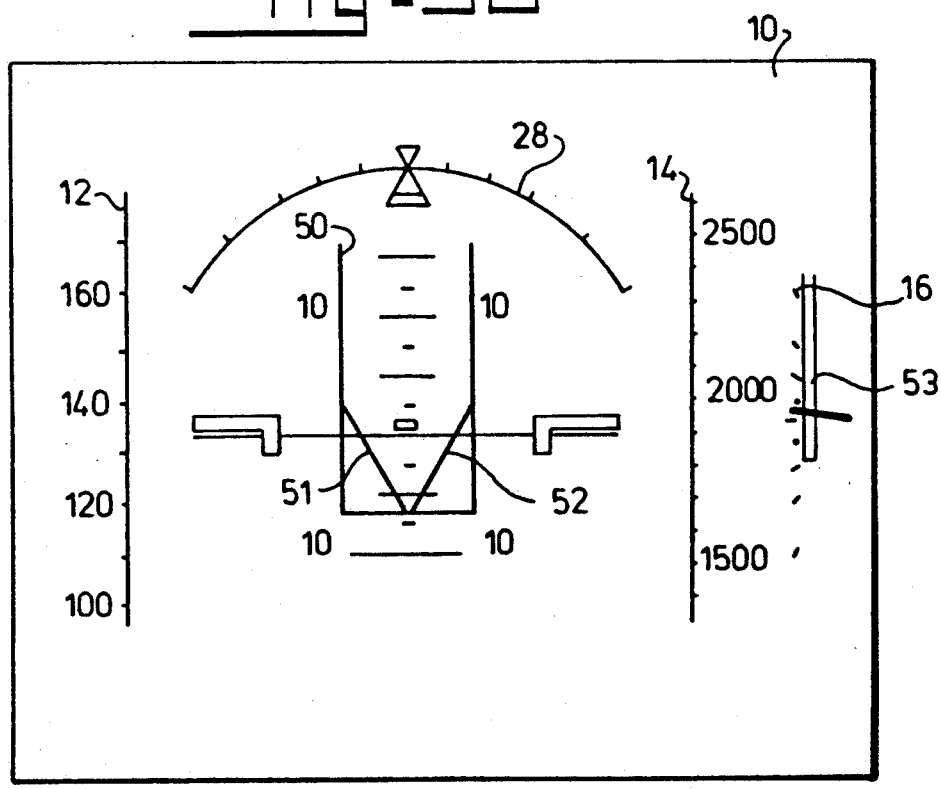

A similar situation is illustrated in FIG. 3B. In this case the crew receives through the combined resolution advisory symbols the command DESCENT. The two sloped lines 51 and 52 are forming together an arrow which points downwards inside the U-shaped section 50 of the pitch cue symbol which indicates the range of unwanted pitch values. Together with the red bar indicator 53 indicated along the vertical speed scale 16 the crew gets the advise to lower the vertical speed and to select lower pitch values, in other words receives the command DESCENT.

Figure 4:
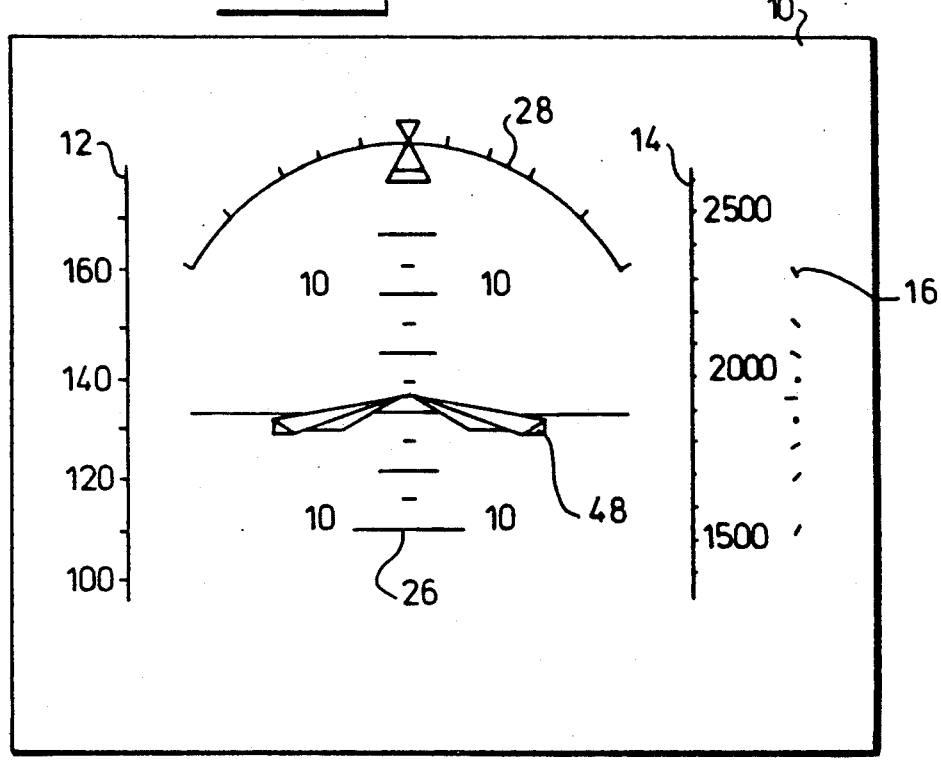
FIG. 4 is illustrative of a front view of a prior art integrated primary flight display (PFD) in which a so called V-bar symbol is used as aircraft reference symbol.

In the FIGS. 1–3B the aircraft reference symbol was of the same type as described in the above mentioned European patent application EP-A-O 324 195. Internationally this aircraft reference symbol is indicated as an X-bar symbol. Another generally known aircraft reference symbol is illustrated in FIG. 4. This aircraft symbol is generally indicated as a so-called V-bar symbol 48. The resolution advisory presentations illustrated in the FIGS. 2–3B can be used together with this aircraft reference symbol without any further alterations. One example is illustrated in FIG. 5.

Figure 5:
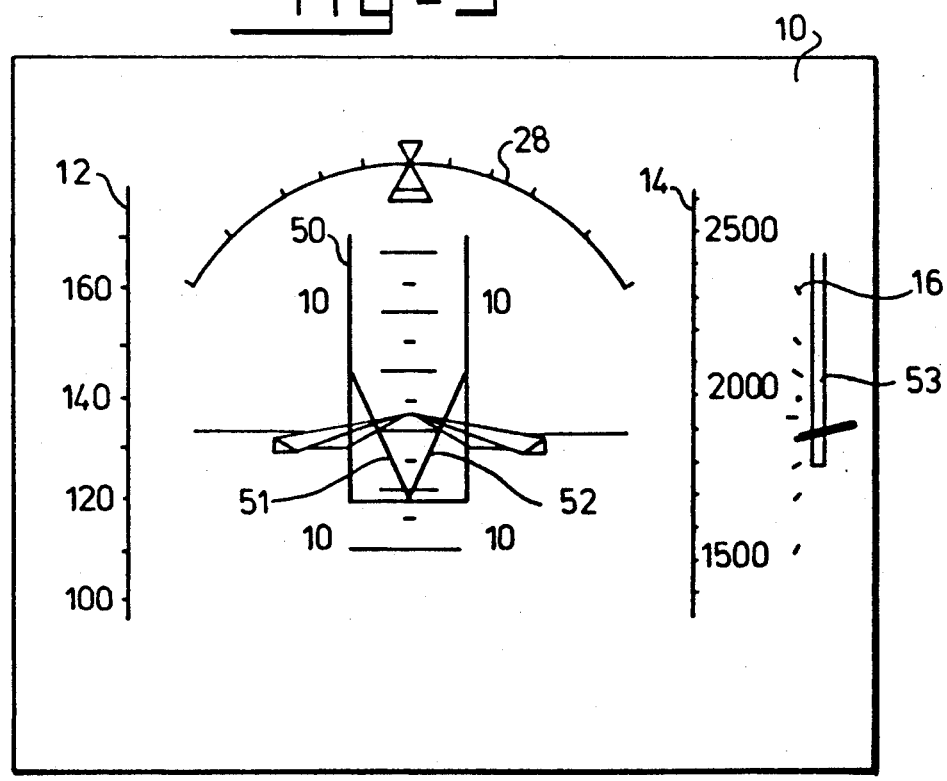
FIG. 5 represents an examplary embodiment of display according to the invention of the resolution advisory presentation in which said V-bar symbol is used. In general FIG. 5 corresponds to FIG. 3B.

FIG. 5 corresponds in fact to FIG. 3B. In both figures the crew receives the command DESCENT.

As explained above the basic pitch cue symbol comprises a horizontal line section (30 in FIG. 2A) and an area indicator symbol which in the aforegoing figures consists of two vertical lines (for instance 32 and 34 in FIG. 2A) which together with the horizontal line segment are forming the U-shaped symbol. However, within the scope of the invention other representations for the area indicator are possible. An example is shown in FIGS. 6A and 6B.

Figure 6A:
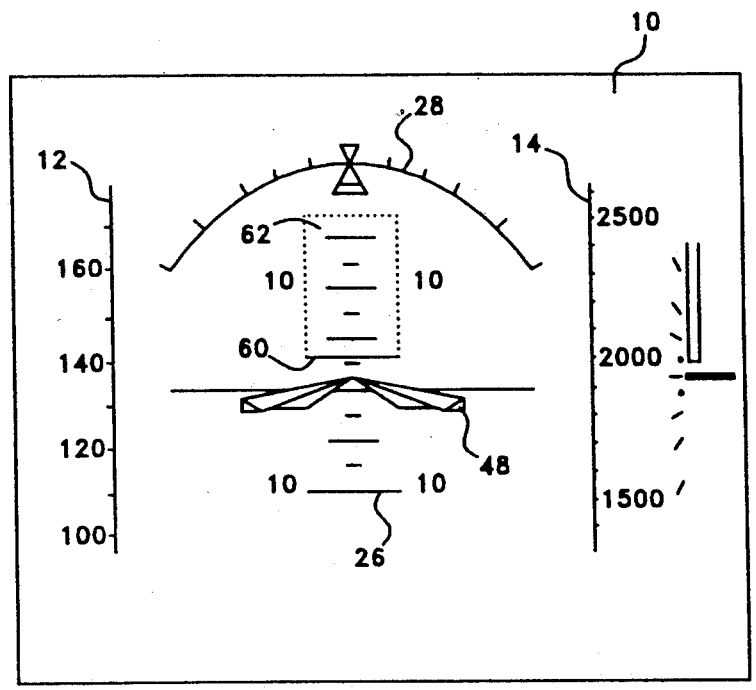
FIGS. 6A and 6B illustrate another embodiment of the resolution advisory presentation according to the invention in which a shaded or differently colored area is used as area indicator section of the resolution advisory symbol.
Figure 6B:
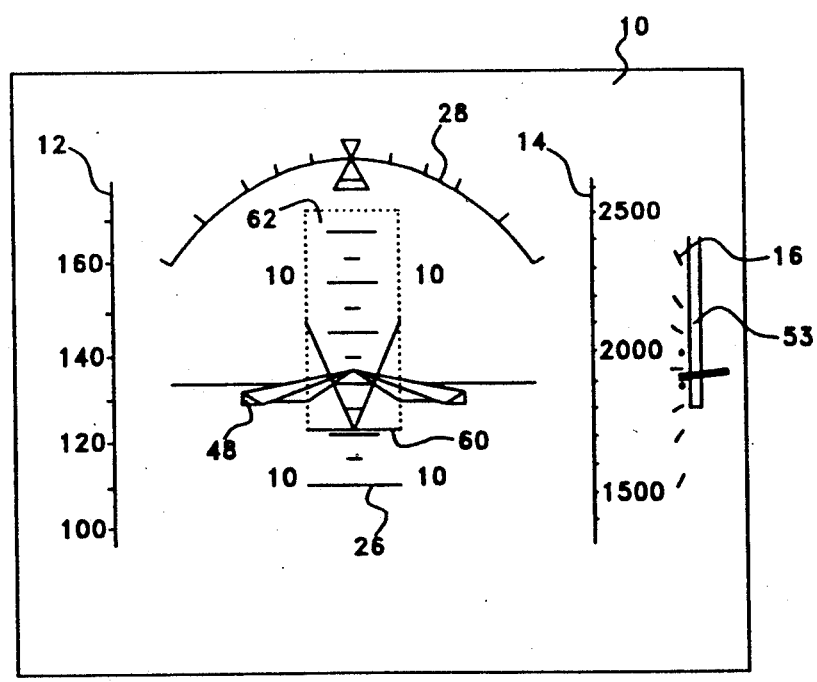
Figure 7A:
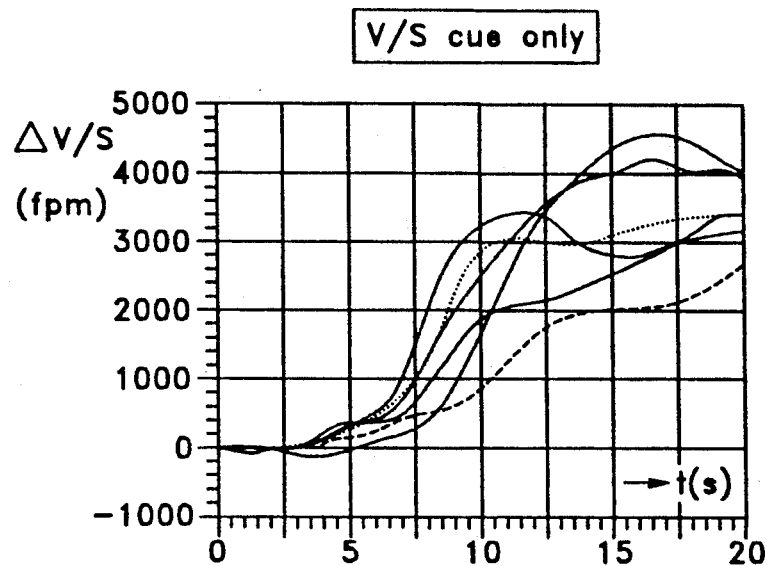
FIGS. 7A, 7B, 7C, 7D, 7E and 7F illustrate in the form a number of diagrams the differences in the pilots reactions both in case only a vertical speed cue is shown (prior art situation) and in case a vertical speed cue combined with a pitch cue are shown.
Figure 7B:
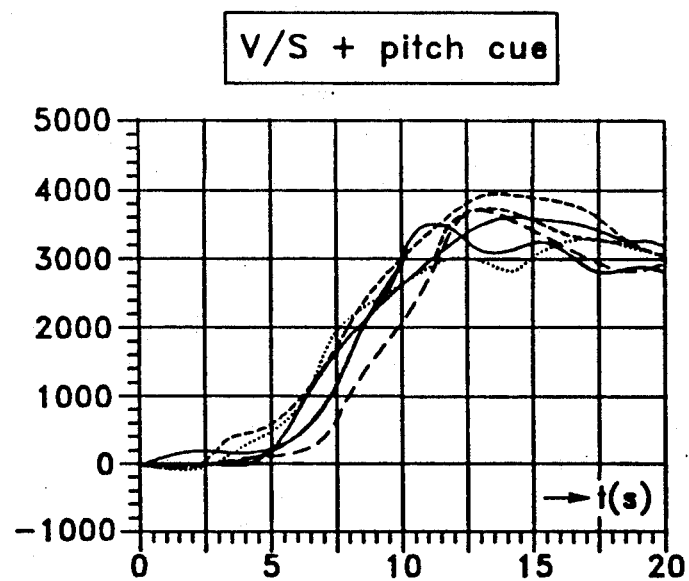
Figure 7C:
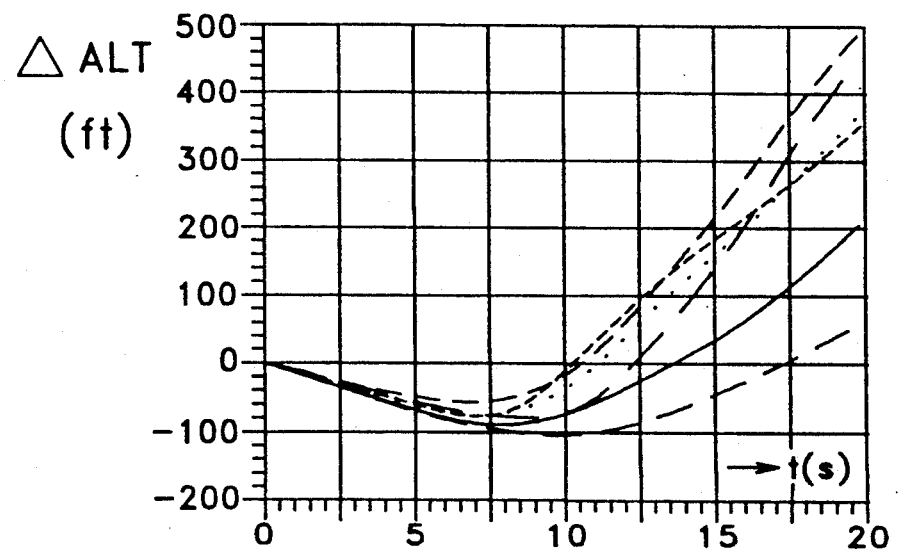
Figure 7D:
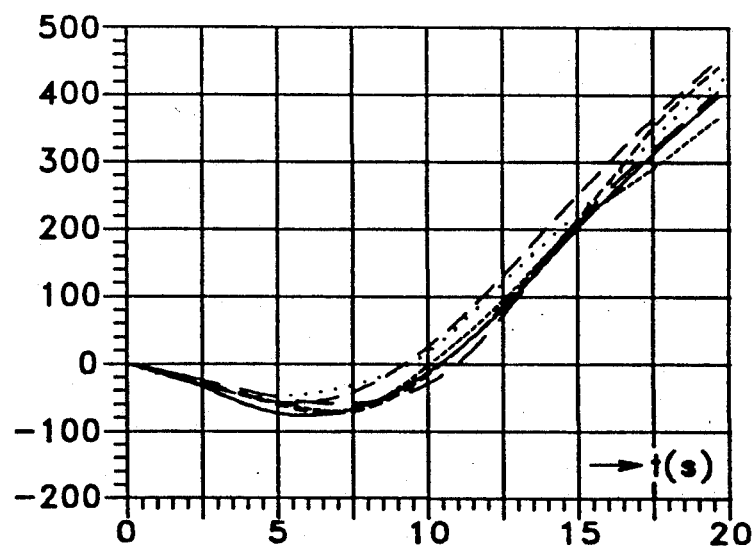
Figure 7E:
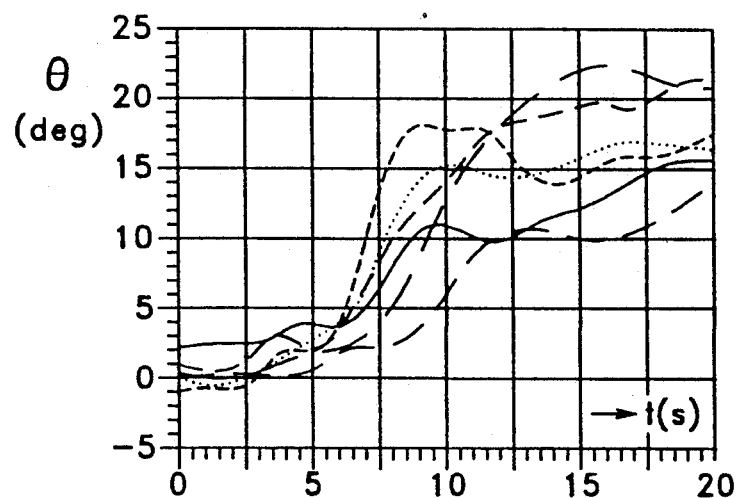
Figure 7F:
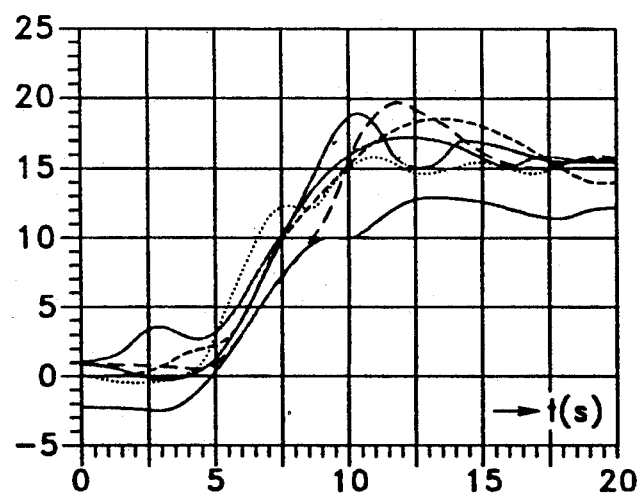

The pitch cue symbol illustrated in FIG. 6A, representing a DON'T CLIMB pitch cue advisory, comprises a horizontal line segment 60 which is combined with a shaded area 62, in this case positioned above the horizontal line segment 60. Together the complete symbol 60, 62 indicates an area of pitch values which in the momentaneous situation have to be avoided. This symbol of FIG. 6A can be extended with an arrow section as is illustrated in FIG. 6B representing the case in which the crew receives the command DESCENT. In fact the situation leading to the representation in FIG. 6B corresponds with the situation which has caused the display of FIG. 3B. It will be clear without illustration that the pitch cue advisories DON'T DESCENT and CLIMB can be displayed in a similar manner.

Instead of a shaded area indicator symbol also a differently colored area or a (cross) hatched area can be used.

To obtain data about the practical advantages of the symbolic representation discussed above applicant has carried out tests in a flight simulator. Ten pilots participated in the simulator program as subject pilots. All selected flight scenarios were flown in the autopilot (AP) mode. In case that a corrective resolution advisory required a pitch change the autopilot was disengaged and the evasive maneuver was performed manually. After the TCAS symbol disappeared the pilot resumed automatic flight by selecting the AP mode.

Said flight simulator tests were carried out with the proposed vertical speed and pitch cues, and also the interface between pitch cue and flight director (either X-bar or V-bar type) was evaluated. Moreover the dynamic behavior of the pitch cue was evaluated. Three different flight phases have been considered for the test senario's: high-speed cruise, climb and descent/approach. Two options were considered: "vertical speed cue only" (prior art) and "combination of vertical speed plus pitch cue" (underlying invention).

During the tests data were recorded and examples of this recorded data are presented in FIGS. 7A–7F. These figures show the responses of some important variables such as time dependent change of vertical speed ($\Delta V/S$) change of altitude ($\Delta$alt) and pitch attitude ($\theta$) resolution advisory (RA). The presented time histories show recordings of 6 different test runs that were flown by the pilots using the X-bar flight director. The time histories show responses to a corrective RA, given during an airfield approach scenario shortly after the 25° flap selection was made. At time-0 a RA of 1500 fpm climb was commanded, while the aircraft was in a descending approach with approximately 800 fpm rate of descent. The data recorded during the tests in the flight simulator confirmed that the pitch cue was used for primary flight guidance and the "VS-only" cue for secondary information. Other observations expressed that:

the pitch cue improves performance; the "VS-only" cue tends to overcorrections because of lag in vertical speed.

especially for the higher VS commands the "VS-only" cue is less sufficient than "the VS-plus-pitch" cue.

for the "the VS-plus-pitch" cue symbology the results are more consistent than for the VS cue only. This is especially manifested by the altitude change ($\Delta$ALT) and vertical speed change ($\Delta V/S$) plots. Also the pitch attitude ($\theta$) shows a more gradual variation in the "VS plus pitch" cue case.

In the performance of the climb senario's it appears that the commanded vertical speed was attained quicker for the "VS-plus-pitch" cue case for both "increase climb" and the "reduce climb" resolution advisory.

In the performance of an "increase climb" RA ten seconds later followed by a "descent" RA was found that with the "VS-plus-pitch" cue the pilots reacted very alert on the second RA in a very consistent way. With the "VS-only" cue the reactions were less uniform, which could also be observed from the time histories.

We claim:

1. A display for presenting symbolically to an aircraft flight crew resolution advisory information developed by a Traffic Collision Avoidance System (TCAS) computer aboard an aircraft said computer providing a vertical speed limit output wherein said display comprises:
   a line symbol representing the artificial horizon,
   a pitch scale extending perpendicularly to said line symbol and indicating pitch angles with reference to said line symbol,
   an aircraft reference symbol indicating by its position on said pitch scale the instantaneous aircraft pitch attitude, wherein said display further comprises:
   a pitch cue symbol having
   a first line segment extending parallel to the artificial horizon and across said pitch scale, said first linesegment indicating a limit pitch value processed from said TCAS vertical speed limit output, and
   an area indicator extending from said line segment and indicating a range of pitch values bounded by said limit pitch value, which range of pitch values has to be avoided by the aircraft flight crew.

2. A display according to claim 1 wherein the area indicator comprises two auxilliary line segments extending from the opposite ends of said first line segment perpendicular thereto in the direction of the pitch values to be avoided such that a U-shaped symbol is obtained.

3. A display according to claim 1 wherein said pitch cue symbol further comprises: a second line segment extending parallel to the artificial horizon and across said pitch scale, said line segment indicating a second limit pitch value processed from the TCAS vertical speed limit output; and a second area indicator extending from said second line segment and indicating a second range of pitch values bounded by said second limit pitch value, which second range of pitch values is not coinciding with said first range of pitch value and has to be avoided also by the aircraft flight crew.

4. A display according to claim 3 wherein the second area indicator consists of two further auxiliary line segments extending from the opposite ends of said second line segment perpendicularly thereto in the direction of the pitch values to be avoided such that a U-shaped symbol is obtained.

5. A display according to claim 3 wherein said pitch cue symbol further comprises an arrow shaped symbol positioned within the area indicator and pointing to said first or second line segment respectively.

6. A display according to claim 2 wherein the aircraft reference symbol is of a generally known X-bar type reference signal comprising a boresight symbol and two wing symbols and wherein the distance between the auxiliary line segments is smaller than the distance between the wing symbols of the aircraft reference symbol.

7. A display according to claim 1 wherein said area indicator is rendered visually distinctive by markings selected from the group consisting of shading, hatching, crosshatching or a color differentiation.

* * * * *